US010592433B1

(12) United States Patent
Whelihan (10) Patent No.: US 10,592,433 B1
(45) Date of Patent: Mar. 17, 2020

(54) SECURE EXECUTION OF ENCRYPTED SOFTWARE IN AN INTEGRATED CIRCUIT

(71) Applicant: Massachusetts Institute of Technology, Cambridge, MA (US)

(72) Inventor: David Whelihan, Framingham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 511 days.

(21) Appl. No.: 14/967,922

(22) Filed: Dec. 14, 2015

Related U.S. Application Data (60) Provisional application No. 62/265,598, filed on Dec. 10, 2015.

(51) Int. Cl.
| | |
|---|---|
| G06F 11/30 | (2006.01) |
| G06F 12/14 | (2006.01) |
| G06F 12/0802 | (2016.01) |
| G06F 21/71 | (2013.01) |

(52) U.S. Cl.
CPC ...... *G06F 12/1408* (2013.01); *G06F 12/0802* (2013.01); *G06F 21/71* (2013.01); *G06F 2212/402* (2013.01); *G06F 2212/60* (2013.01)

(58) Field of Classification Search
CPC .......... G06F 12/1408; G06F 12/0802
See application file for complete search history.

(56) References Cited

U.S. PATENT DOCUMENTS

| | | | | |
|---|---|---|---|---|
| 6,938,166 B1 * | 8/2005 | Sarfati | ................ | G06F 9/4843 382/116 |
| 2001/0042070 A1 * | 11/2001 | Jinzaki | ................ | G06F 16/902 |
| 2005/0283662 A1 * | 12/2005 | Li | ................ | G06F 21/6209 714/13 |
| 2006/0156005 A1 * | 7/2006 | Fischer | ................ | G06F 21/52 713/176 |
| 2007/0136607 A1 * | 6/2007 | Launchbury | ................ | G06F 12/1408 713/190 |
| 2008/0320319 A1 * | 12/2008 | Muller | ................ | G06F 21/6209 713/193 |
| 2011/0246787 A1 * | 10/2011 | Farrugia | ................ | G06F 21/60 713/189 |
| 2012/0008782 A1 * | 1/2012 | Furukawa | ................ | H04L 9/002 380/268 |
| 2012/0307997 A1 * | 12/2012 | Endo | ................ | H04L 9/003 380/28 |
| 2013/0318362 A1 * | 11/2013 | Mothilal | ................ | G06F 12/0246 713/193 |
| 2014/0010371 A1 * | 1/2014 | Khazan | ................ | G06F 21/602 380/278 |
| 2014/0040596 A1 * | 2/2014 | Fleischer | ................ | G06F 9/30043 712/205 |
| 2014/0317374 A1 * | 10/2014 | Culley | ................ | G06F 12/0246 711/206 |
| 2015/0242607 A1 * | 8/2015 | Morris | ................ | H04L 9/3231 713/186 |
| 2016/0020903 A1 * | 1/2016 | de Perthuis | ................ | H04L 9/30 380/44 |

* cited by examiner

*Primary Examiner* — John B King
*Assistant Examiner* — Darshan I Dhruv
(74) *Attorney, Agent, or Firm* — Occhiuti & Rohlicek LLP (57) ABSTRACT

A method for processing addressable encrypted data representing addressable cleartext data uses an integrated circuit including a processor circuit. The method includes processing the addressable cleartext data in the processor circuit without storing said cleartext data outside the processor circuit.

19 Claims, 10 Drawing Sheets

SECURE EXECUTION OF ENCRYPTED SOFTWARE IN AN INTEGRATED CIRCUIT

CROSS-REFERENCE TO RELATED APPLICATIONS

This application claims the benefit of U.S. Provisional Application No. 62/265,598 filed Dec. 10, 2015, the contents of which are incorporated herein by reference.

STATEMENT AS TO FEDERALLY SPONSORED RESEARCH

This invention was made with Government support under Grant No. FA8721-05-C-0002 awarded by the U.S. Air Force. The Government has certain rights in the invention.

BACKGROUND

This invention relates to secure execution of software.

Modern computing environments are trending toward a highly decentralized model in which the exaction location of execution of a program is unknown to a user. This model is commonly referred to as "cloud computing." Cloud computing makes big data computing and high performance computing available to a wider set of consumers who ordinarily could not afford to build and maintain their own supercomputers and data centers. This model however has limitations: if the user does not know where their code or data is executing, the user cannot know whether their code was inspected or stolen by a competitor.

SUMMARY

Some approaches to guaranteeing confidentiality of code and data utilize code and data stream encryption. These approaches are limited due to the performance impact incurred due to decryption and the difficulty of predicting paths of code execution. Due to these limitations, code stream encryption is difficult to implement without adversely affecting performance.

Some approaches remedy this problem by decrypting the code stream in its entirety into memory only once so that performance is minimally impacted. However, these approaches expose code to inspection and possible theft by malware or operating systems.

In an aspect, rather than encrypting code and/or data using the AES algorithm, a nonce and a special count value corresponding to a location of the code and/or data in the aggregate code stream are encrypted. The encrypted nonce and count value are then combined (e.g., XOR'ed) with the code and/or data. The code and/or data is not required to begin the encryption/decryption process. Instead, the nonce and the location of the data in the code or data stream is all that is required. By using a unique combination of virtual address bits to represent the count, on an L1 cache miss, the processor can begin computing the counter mode mask while the ciphertext data is being fetched. When the data finally arrives at the L1 cache, the counter mode mask has already been computed, and the data is decrypted with a single, near latency-less XOR operation. The mask can be stored in an accessible region of the chip. In this approach, code and/or data is encrypted right up to the point just before the processor's execution unit. With the caches encrypted, an attack surface of the processor is greatly reduced.

In an aspect, in general, a method for processing, in an integrated circuit, addressable encrypted data representing addressable cleartext data, the integrated circuit including a processor circuit and a first storage circuit, the processor circuit having a memory interface for providing an address from the processor circuit and communicating corresponding addressable data to or from the processor circuit, the method including processing the addressable cleartext data in the processor circuitry without storing said cleartext data outside the processor circuit. The processing includes maintaining addressable mask data in the first storage circuitry, the mask data having a number of segments, each segment being associated with a corresponding address, wherein the mask data for a segment depends at least in part on the corresponding address of said segment, providing an address via the memory interface from the processor circuit, accessing a mask segment corresponding to said provided address from the first storage circuitry, accessing encrypted data associated with the provided address from a second storage according to the provided address, and combining the accessed mask segment with data passing between the memory interface of the processor circuit and the second storage without storing corresponding cleartext data outside the processor circuitry.

Aspects may include one or more of the following features.

The method may include generating the mask segment corresponding to said address according to the provided address and storing the mask segment in the first storage circuitry. The method may include accessing the encrypted data associated with the provided address from a third storage according to the provided address, wherein the generation of the mask segment occurs during the accessing of the encrypted data associated with the provided address from the third storage. Generating the mask segment according to the provided address may include combining the provided address with a secret key value, the secret key value being associated with the addressable encrypted data. Generating the mask segment according to the provided address may include further combining the combination of the provided address and the secret key value with a nonce value and a counter value representing an offset from the provided address.

Combining the accessed mask segment with data passing between the memory interface of the processor circuit and the second storage may include performing an exclusive-or operation on the accessed mask segment and the data. The method may include combining the accessed mask segment and the data with processor context-specific mask data. Accessing the encrypted data associated with the provided address from the second storage according to the provided address may include storing the combination of the accessed mask segment and the data at the provided address in the second storage. Accessing the encrypted data associated with the provided address from the second storage according to the provided address may include reading the encrypted data from the provided address in the second storage. Providing the address via the memory interface from the processor circuit may include executing a load or a store instruction in the processor circuit to cause the address to be provided. The method may include storing the cleartext data in register circuitry internal to the processor circuit.

The method may include initiating processing of the addressable encrypted data including, executing a loading instruction for loading a secure processor context into the integrated circuit, including loading the secret key, the nonce, and context-specific mask data into the integrated circuit, and executing a secure jump instruction for activating the secure processor context. Executing the loading instruction may include authenticating a source of the secure context using certificate and signing techniques. Executing the loading instruction may include decrypting an encrypted version of the secret key and an encrypted version of the nonce. The method may include accessing redundancy data associated with the provided address from the second storage, the redundancy data being formed from the cleartext data associated with the provided address.

The method may include verifying an integrity of the encrypted data according to the redundancy data. Verifying the integrity of the encrypted data may include recomputing the redundancy data according to the corresponding cleartext and comparing the recomputed redundancy data to the accessed redundancy data. The method may include updating the redundancy data prior to accessing the encrypted data. Updating the redundancy data prior to accessing the encrypted data may include computing updated redundancy data according to updated cleartext data provided from the processor circuit.

In another aspect, in general, an integrated circuit for processing addressable encrypted data representing addressable cleartext data includes a processor circuit having a memory interface for providing an address from the processor circuit and communicating corresponding addressable data to or from the processor circuit, a first storage circuit for maintaining addressable mask data, the mask data having a number of segments, each segment being associated with a corresponding address, wherein the mask data for a segment depends at least in part on the corresponding address of said segment, and combination circuitry for combining a mask segment accessed from the first storage circuitry and corresponding to an address provided by the memory interface with encrypted data accessed from a second storage circuitry and corresponding to the address provided from the memory interface to generate cleartext data, and for providing the cleartext data to the processor circuitry without storing the cleartext data outside of the processor circuitry.

Other features and advantages of the invention are apparent from the following description, and from the claims.

DESCRIPTION

Figure 1:
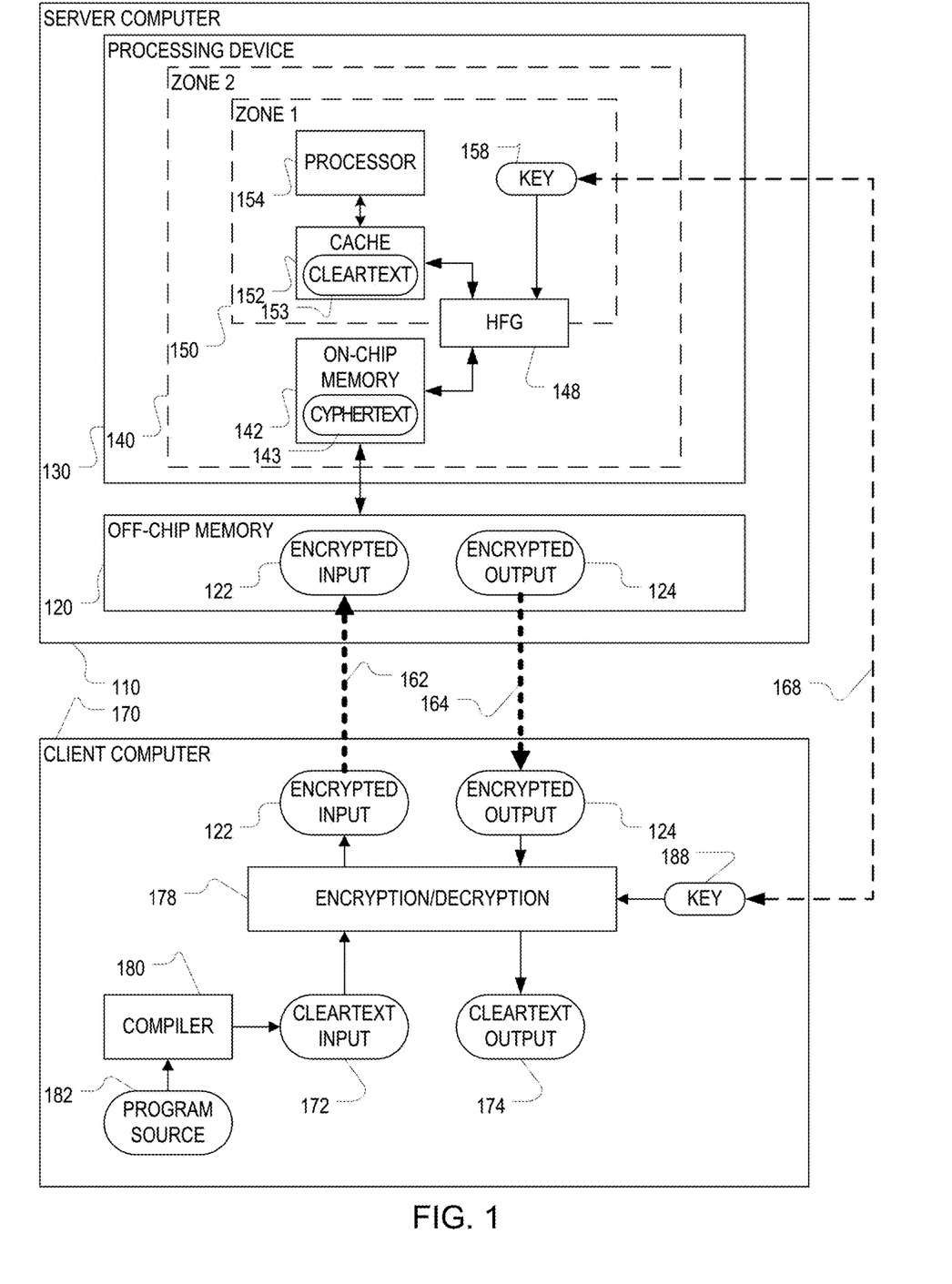
FIG. 1 is a block diagram illustrating a first approach to secure execution in a client and server computer system.

Referring to FIG. 1, one approach to secure execution of software on a server computer in a client and server computer system 100 makes use of hardware based security features of a processing device at the server. As described below, in some implementations, techniques described in co-pending U.S. Application US2014/0013123A1, "DATA SECURITY USING INTER-ZONE GATE CIRCUITS", published on Jan. 9, 2014, which is incorporated herein by reference, are used in at least some embodiments of the system. However it should be understood that other techniques can also be used to achieve some of the functions.

In FIG. 1, a server computer 110 includes a processing device 130 (e.g., referred to at times as a "secure processor", recognizing that the device includes within it circuitry that is also referred to as a "processor" 154 along with other circuitry). The processing device includes hardware-based security features that define as number of security zones, each associated with a particular level of security. For example, a zone 1 (150) is relatively more secure that zone 2 (140). The security level of zone 1 is such that it may be acceptable to have software stored within that zone without being encrypted, while the software must remain encrypted on the processing device 130 and more generally on the server computer 110 outside that zone 1. In this first approach illustrated in FIG. 1, a client computer 170 uses a compiler 180 to process a program source 182 to form a cleartext input 172, which includes the compiled program. This cleartext output may also include data. At the client computer 170, which for the purpose of this example, is assumed to be secure such that the software cannot be compromised (e.g., disclosed, tampered with, etc.), the cleartext input 172 is encrypted by an encryption/decryption unit 178 (which may be implemented in hardware, software, or a combination of hardware and software) to form the encrypted input 122 for the server computer 110. Because this data is encrypted, it can be transported to the server 110, for example, over an insecure network, and stored on the server computer 110, for example, in an off-chip memory 120, such as a magnetic or semiconductor memory system. This encrypted data is provided to the processing device 130 via an off chip memory controller 121, and initially stored in an on-chip memory 142, which holds some or all of the encrypted data. For example, in some cases, this on-chip memory cannot hold the entirety of the encrypted data, and it functions as a cache for the off-chip memory. In general, the encrypted data is decrypted or otherwise modified by the off chip memory controller 121 but is instead simply transferred from the off-chip memory 120 and into the processing device 130 where it is stored, in its encrypted form, to the on-chip memory 142.

In FIG. 1, a hardware component 148, referred to as a Hardware Functional Gate (HFG) permits transfer of data from the on-chip memory 142 into a cache memory 152 within zone 1 by decrypting the data using a key 158 as the data is read into the secure zone 1. The key 158 that is present in zone 1 of the processing device 130 corresponds to the key 188 that was used to encrypt the data at the client computer 170. Various approaches to establishing the corresponding keys 158,188 can be used. As an example, distribution of "key wraps" as described in US2014/0013123A1 can be used. Data that is determined as a result of execution of the software by the processor 154 is similarly encrypted as it leaves zone 1, and is stored as encrypted output 124 on the server computer 110. This encrypted output 120 can again be passed over an insecure channel to the client computer 170, where it is decrypted to yield the cleartext output 174 from the execution of the software.

Figure 2:
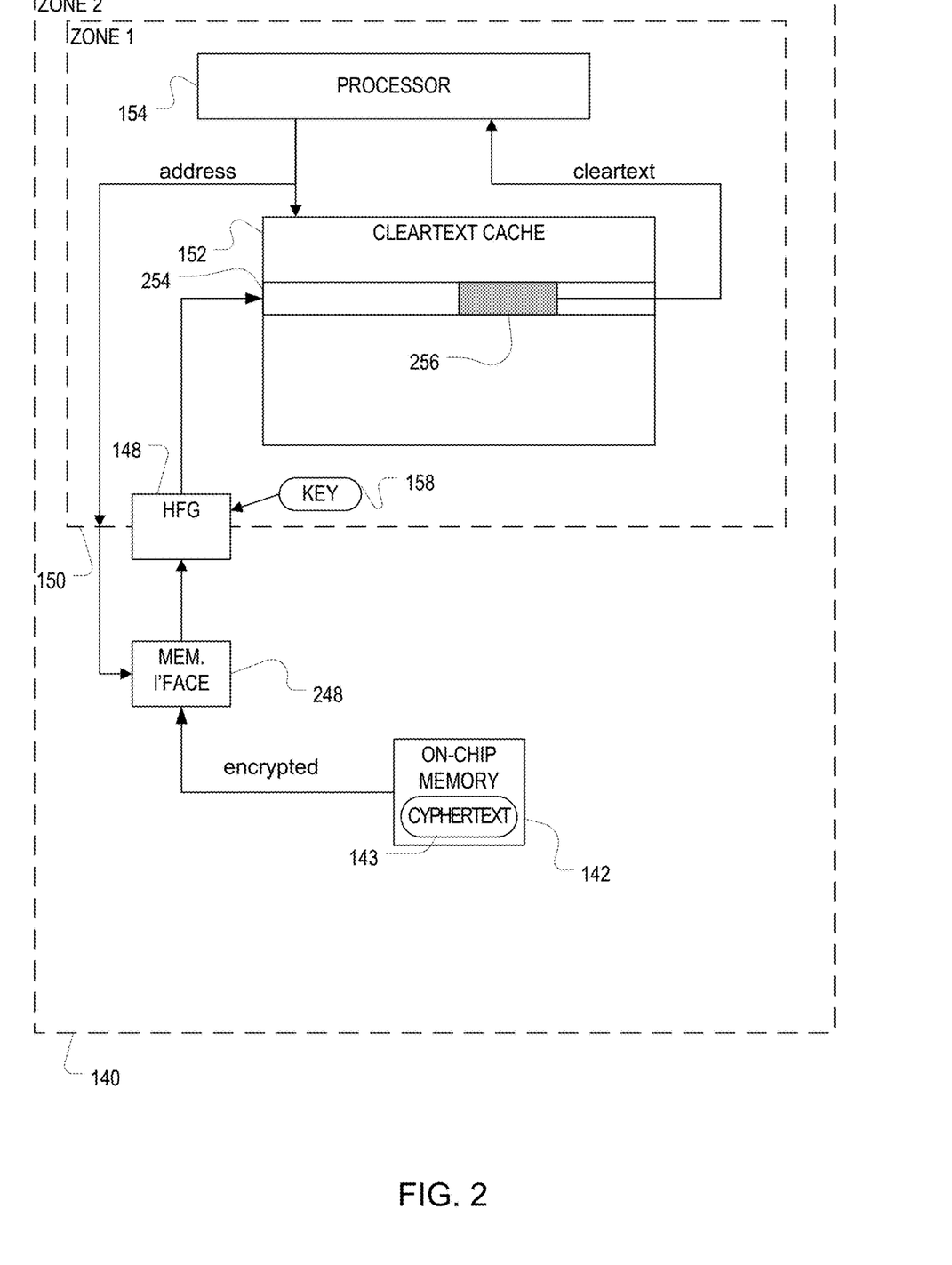
FIG. 2 is a detailed block diagram corresponding to part of FIG. 1.

Referring to FIG. 2, the approach illustrated in FIG. 1 can be understood in more detail illustrating the cache 152, which includes a number of sections 254, which are generally referred to as "cache lines." Each section 254 includes a number of addressable parts 256 (e.g., "words"), for example with each part being four bytes in size. For example, each section 254 may comprise 16 addressable parts (e.g., 16 times 4=64 bytes per cache line), but of course other section sizes and addressable part sizes can be used in other embodiments. As is conventional, the processor 154 requests an addressable part stored at an address by passing that address to the cache (or to a controller of the cache that is not shown). If the cache 152 includes that data, it is provided directly from the cache 152 to the processor 154. On the other hand, if the data is not present in the cache 152, a "cache miss" occurs, and the data for the section of memory including the requested address is requested via a memory interface 248 by passing the address of the section (i.e., the address of a first part of the section) from zone 1 (150) into zone 2 (140). The memory interface 248 accesses the encrypted form of the requested section of memory and passes it to the HFG 148, which decrypts it as it is passed from zone 2 to zone 1 using the prearranged key 158. The decrypted data stored in the section 254 and the addressed part 256 is passed to the processor 154.

Not illustrated in FIG. 2 is the procedure of writing back data from the cache 152 to the encrypted memory. Generally, when a new section of memory needs to be brought into the cache 152, room may have to be made in the cache 152 essentially overwriting data that is already in the section of the cache, but associated with a different section of the address space being used by the processor. If the data to be overwritten has not yet been written back to the main memory, a "writeback" (or "eviction") procedure may have to be performed. In the embodiment shown in FIG. 2, the writeback of data from the cache 152 to the memory 142 passes through the HFG 148 from zone 1 to zone 2, being encrypted as it passes between the zones.

Note that the arrangement shown in FIG. 2 is only one embodiment. In some embodiments, multiple caches may be used, for example, with one cache being used for instructions (e.g., used for a virtual address range in which instructions are stored), while a second cache is used for data that is read and/or written by the processor. Note that in general, instructions are not modified by the processor such that the instruction cache may not need to address writing back of modified data. Furthermore, it is not necessary that the same approach is used for decryption and encryption for each cache when there are multiple caches. It is possible that different approaches described in this document may be used for different of the multiple caches.

This first approach illustrated in FIG. 1 is functional in that the client's program 182 can be securely executed on the processing device. However, in at least some applications, this approach may have one or more of the following limitations:

A first limitation relates to circuit complexity versus computation speed. In order for the processor 154 in the processing device to execute efficiently, the program instructions must be available in a high-speed memory coupled to the processor. This is primary reason that modern processor design uses a high-speed memory, referred to as a level 1 cache, which is directly coupled to the processor. This cache is generally much smaller than the total memory that is needed to execute the program, therefore only some of that data is maintained in the cache. When the processor requests data that is not in the cache, a "miss" occurs, and the required data is retrieved, typically from another larger but generally slower memory, which may be referred to as a "level 2" cache. In general, there is some delay between the time a processor attempts to access data that is not resident in the level 1 cache and the time that the data is retrieved from the level 2 cache and made available to the processor. In the approach illustrated in FIG. 1, with cache 152 serving as a level 1 cache, and on-chip memory 142 serving as a level 2 cache, when there is a cache miss, the retrieved data passes through the HFG 148, where it is decrypted as it passes from zone 2 to zone 1. Although decryption hardware can be designed to sustain a relatively high throughput, there is an inherent latency that can be significant. Such latency increases the time between the processor 154 requesting data that is not resident in the cache 152 and the time it is available for further processing. One solution is to reduce the frequency of such cache misses. However, the most straightforward way to do this is to increase the size of the cache 152, which results in a slower cache and adds to the complexity, size, and/or power requirements of the circuitry for zone 1 and the processing device in general. Furthermore, the larger the cache 152, the more instructions and data are present in the processing device in an unencrypted form, which although designed to be secure in the zone 1 region, nevertheless is counter to certain principles of data security according to which it is preferable to reduce the time data is exposed anywhere in unencrypted form. Therefore, one or more approaches described below address latency without substantially increasing the complexity, size, or power of circuitry within zone 1 of the processing device. Furthermore, one or more approaches described below address a goal of avoiding storage of unencrypted data, even within zone 1, for example, by avoiding storage of unencrypted data in a cache or even in a register file (not shown in FIG. 1) of the processor.

A second limitation relates to control of execution of the software. In the approach shown in FIG. 1, if an adversary intercepts the encrypted input 122 and makes a copy, that adversary could provide the same encrypted input 122 to the server computer 110 at a later time and execute the software once again. If execution of the software has a side effect, repeated causing of that side effect may violate a security policy. A wide variety of side effects may be significant. One type of side effect can relate to presentation of information to a user. For example, the cleartext input may include instructions and data for presentation of a document to a user. However, the security policy dictates that this document is only permitted to be presented once. In the approach illustrated in FIG. 1, if the encrypted input 122 were executed repeatedly, the document could be presented repeatedly. Therefore, one or more approached described below provide a way of limiting the number of times software can be executed on a server computer, thereby mitigating the impact of attacking involving copying and reusing the encrypted program.

A potential third limitation relates to the nature of the encryption of the software. It is desirable that the encryption of the program (i.e., cleartext input 172) is such that tampering with the encrypted form can be detected and execution of a modified program is prevented. One or more approaches address detection of various forms of tampering, for example, by introduction of consistency check information in the encrypted input 122.

Figure 3:
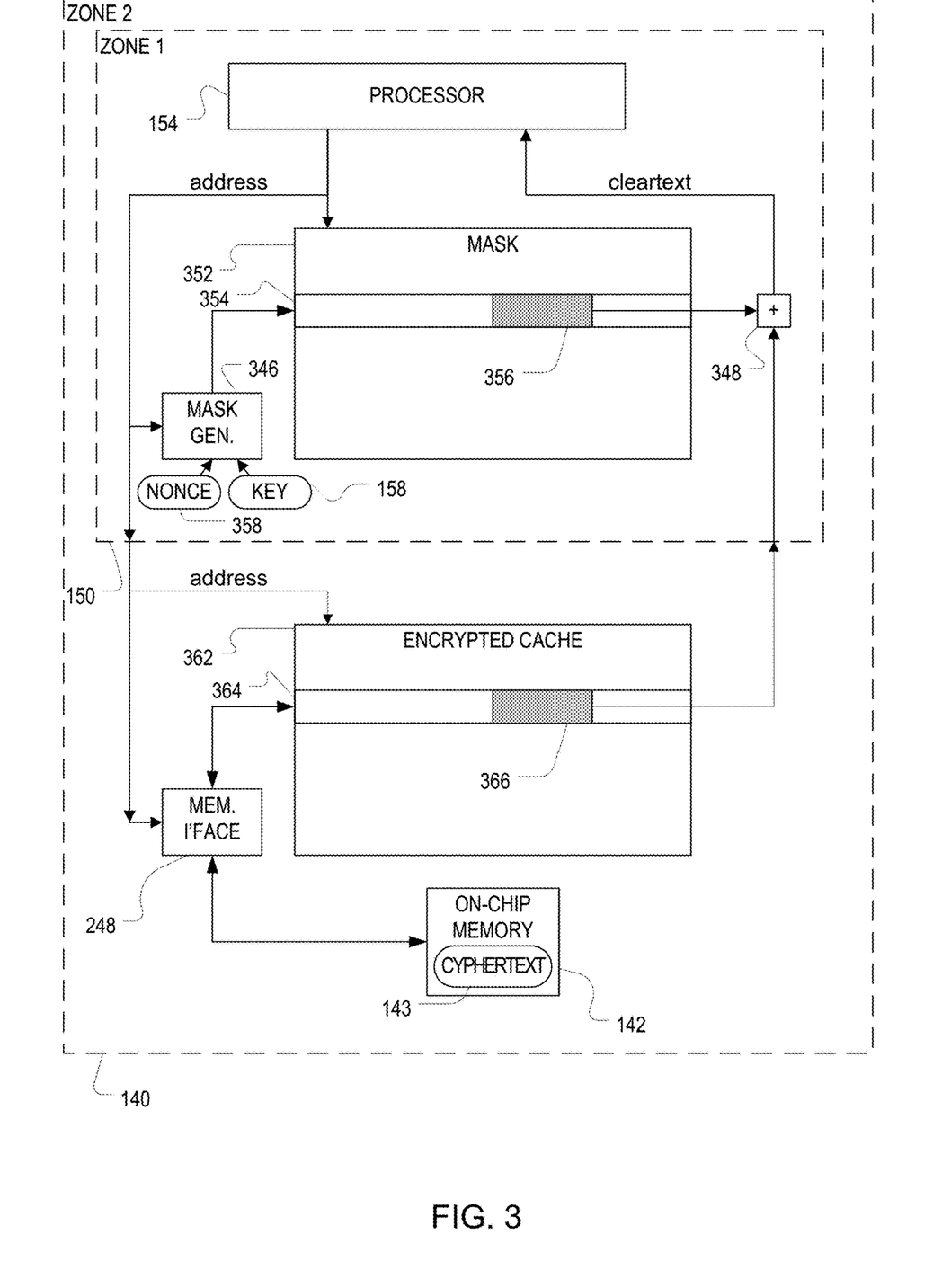
FIG. 3 is a detailed block diagram of a second approach.

Referring to FIG. 3, a second approach is illustrated in a manner that corresponds to the illustration of FIG. 2, which shows the first approach. In this approach, the cache 152 of FIG. 2 is essentially replaced with two memories: an encrypted cache 362, and mask memory 352. The encrypted cache 362 has sections 364 (e.g., "cache lines") and addressable parts 366 (e.g., four bytes each), and the mask memory 352 has corresponding sections 354 and addressable parts 356. The unencrypted value of an addressable part of the unencrypted data is a determinable as a combination of the data in an addressable part 366 of the encrypted cache 362 and the corresponding mask in the addressable part 356 of the mask memory 352. In this embodiment, this combination is an XOR combination implemented by a combination circuitry 348.

In operation, when the processor 154 requests data that exists in an encrypted form in a part 366 of the encrypted cache 362, the encrypted cache 356 passes that data from zone 2 into zone 1. Inside zone 1, this encrypted data is passed to the combination (e.g., XOR) circuitry 348. At the same time as the encrypted cache 362 is passing the encrypted data to the combination circuitry 348, the mask memory 352 is passing the corresponding mask data from the part 356 of the mask memory corresponding to that data to the combination circuitry 348. The combination circuitry combines its two inputs, and passes the result, which is the unencrypted data to the processor.

In this approach, each section of the original data is encrypted somewhat independently. In particular, the mask for each part of the unencrypted data depends on the prearranged key value (e.g., stored at 158) and on the address at which the data will be requested by the processor 154. For added security, the mask is further dependent on a nonce 358, which is arbitrary number used for the execution of the program, or otherwise known to the processor (or other circuitry in zone 1) to be used in decryption of the address. For example, different ranges of memory addresses may have different nonces associated with them.

Note that in a virtual memory system, the address provided by the processor to the cache will in general be a virtual memory address. In this embodiment, the mask for the data at that virtual address is encrypted according to the decryption mask for that virtual address, independent of the physical address at which that data is stored in the on-chip memory 142 or in the off-chip memory 120. Referring back to FIG. 1, generally, the output of a compiler 180 will specify the virtual addresses at which different sections of memory are to be loaded. Therefore, the encryption of the output takes into account the ultimate virtual addresses in determining the encryption.

Note that in alternative embodiments, the output of the compiler may not know the virtual address at which data will be loaded. For example, an address range may be set by a base register (e.g., a "segment register") not known at compile time. In such alternatives, the mask may be set by a portion of the ultimate address that is known at compile time. In other examples, the virtual address at which the data will be loaded is known and offsetting using a segment register is used to minimize code size by permitting immediate offsets in the code.

In this second approach, the mask data for an entire section 354 is determined by the address of the first part of the section, the nonce, and the key. For example, if there are 16 parts each of 4 bytes, the mask data is 64 bytes (512 bits) in size. In some implementations, an AES encryption standard is used to generate the mask. In some such implementations, each application of the AES encryption operation works on a block of 16 bytes (128 bits). For example, the first 128 bits may be formed as an encryption of a quantity formed from the address of the first part of the section and the nonce. Subsequent blocks of masks may be formed as encryptions related to the position of the block with the mask, for example, by incrementing the quantity determined from the address and the nonce for the first part of the section, or otherwise forming a deterministic sequence of quantities. Alternatively, a base address for each part may be used for determining the mask for each section. In one specific embodiment, the computation of successive blocks of the mask for a section are computed using an AES Counter Mode approach. In such a counter mode approach, an initial quantity is determined from the base address of the section and the nonce. This quantity is used for determining the first block of the mask data for the section, and is incremented for determining each successive block of the mask data.

Continuing to refer to FIG. 3, in the case that a desired section of memory is not resident in encrypted form in the encrypted cache 362 (and correspondingly, the mask for that section is not in the mask memory 352), a cache miss occurs as would occur in a conventional cache-based memory system. In this embodiment, two concurrent operations are performed in response to the cache miss. In zone 2, the memory interface 248, which has identified the need to retrieve the section of memory and determined the section 364 of the encrypted cache 362 where that data will reside causes that part of the encrypted data to be retrieved from the on-chip memory 142 and stored in the section 364 of the cache 362. Concurrent with this operation, a mask generator 346 has independently determined or has been instructed to prepare mask data for the addressed section, and proceeds to fill the section 354 of the mask memory 352 with the mask determined from the nonce 358 and address of the section 354 and the key 158. Once both the encrypted cache 366 can provide the encrypted part of the data from zone 2 into zone 1 to the combination circuit 348 and the mask memory 352 can provide the mask for the part to the combination circuitry 348, the unencrypted part can be provided to the processor to satisfy the memory read request.

The process for a write request follows a similar pattern. If the processor writes to an address that is resident in the cache 362, with a corresponding mask in the mask memory 352, the unencryped value from the processor 154 is combined with the mask value in the combination circuitry 348 (in this case operating in the reverse direction from that shown in FIG. 3), with the combination being passed from zone 1 to zone 2 and stored in the encrypted cache 362.

The process for writing back a segment 364 from the encrypted cache 362 to the on-chip memory 142 uses a conventional approach. The corresponding mask data in a segment 354 of the mask memory 352 is not written out, and will be replaced with newly generated mask data for the new address that is to occupy that segment.

In the above embodiments, and in other embodiments described below, in the process of initiating execution of a program (or equivalently execution of a thread or other unit of execution associated with processor instructions), data representing the encrypted unit of software is processed by a loading instruction. In some examples, a keywrap loading instruction, which loads a secure context (i.e., a set of keys used to execute the encrypted code) and a "secure jump" instruction which jumps to the encrypted code and activates the secure context are used to process the data representing the encrypted unit of software. In some examples, the encrypted software 400 includes the components illustrated in FIG. 4.

Figure 4:
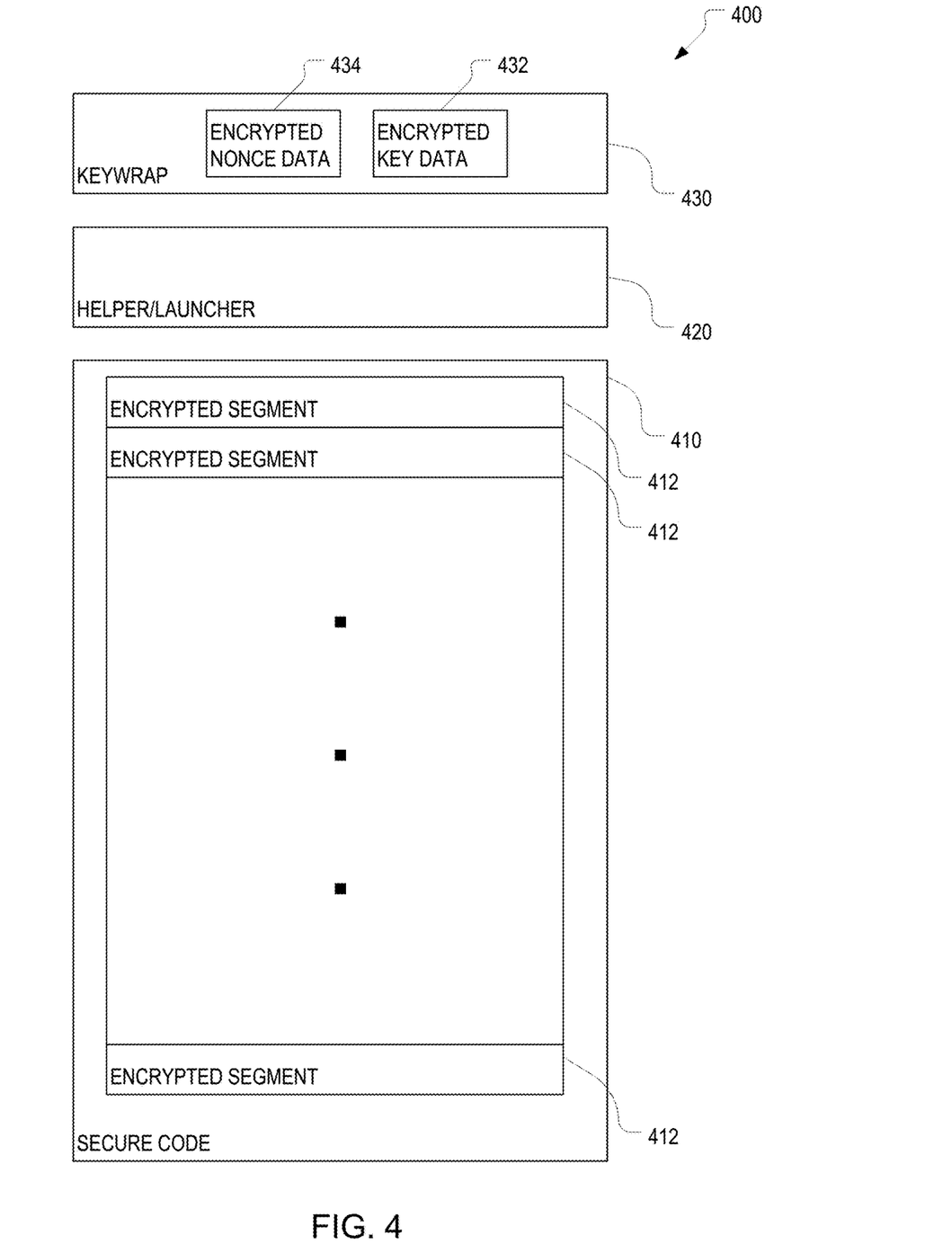
FIG. 4 is an illustration of components of an encrypted input.

A main body 410 of the software includes a set of encrypted segments 412, each of which may be loaded into a segment 364 of the encrypted cache 362 shown in FIG. 3. Note that there are not generally any boundaries between the segments 412 in the body 410, and they are shown as distinct segments for illustration—in general the client does not have to know the size of the cache segments because the decryption approach is based on the addresses at which the parts of software are loaded.

A helper/launcher section 420 is used by the processor to initiate execution of the encrypted part of the program. In some examples, this code includes data and/or tables that are used to map sections of the input into the virtual address space of the processor, serving much of the same function of a relocation table found in various executable file formats (e.g., in the Microsoft Win32 Executable File Format or in the Linux Executable and Linkable (ELF) format). Note that in the embodiment illustrated in FIG. 3, the mapping of virtual addresses emitted from the processor 154 to physical addresses at which section of the program body 410 are loaded is handled at the interface between the encrypted cache and the on-chip memory, and therefore conventional address translation techniques are used independent of the decryption and encryption of data in the encrypted cache 362.

A further section includes a keywrap 430, which includes encrypted nonce data 434 and encrypted key data 432. The keywrap includes sufficient information for the processor to authenticate the source of the keywrap, for example, using certificate and signing techniques described in US2014/0013123A1, "DATA SECURITY USING INTER-ZONE GATE CIRCUITS". The keywrap includes sufficient information for the processor to decrypt the encrypted nonce data 434 within zone 1 of the processor, and load the nonce into the nonce register 358 (shown in FIG. 3). Similarly, the processor decrypts the encrypted key data 432 in zone 1 to obtain the key to be loaded into the key register 158. Note that a variety of specific formats of the keywrap may be used, for example, with the encrypted being encrypted with a key encryption key (KEK), and the key encryption key being encrypted with the public key of the processor. In such an example, the processor uses its private key to decrypt the key encryption key and then to decrypt the key that is used to decrypt the program data as it is needed. The keywrap may also include a certificate for client, signed directly by or through a chain of trust from an entity trusted by the processor, and a signature of the information in the keywrap signed by the client. In some examples, the keywrap is processed by helper/launcher code in the helper/launcher section 420. In other examples, a loader for the secure software 400 is already resident and trusted by the processor, and the keywrap 430, as well as various relocation data etc. are processed using the resident loader in the processor.

In general, each program instance running on the processor is associated with its own unique keywrap. In particular, each thread or set of threads associated with a program that is executing on the processor is associated with a unique key set that must be used to decrypt code and data associated with the program. In order for a program to execute, the encryptor/decryptor must be on and must decrypt/encrypt any data that passes into or out of the processor using the keys from the keywrap. When the processor switches thread contexts, the processor forces a change in the key set. For example, when a first context associated with a first thread of a first program is switched out for a second context associated with a second thread of a second program, the processor forces a switch in the key set being used from a first key set associated with the first program to a second key set associated with the second program. Due to this enforced relationship between a key set and a corresponding encrypted program, any attempt to execute other code (e.g., new code or code from another program that is executing in the system) in the context of the processing thread(s) of an executing program will be thwarted since the other code will not be decryptable using the key set associated with the processing thread.

In some examples, each cache line in the encrypted cache 364 includes an ID field including a context identifier of the requesting context (i.e., the context that requested the data stored in the cache line). If a context other than the context that requested the cache line attempts to ead from that address, the encrypted cache 364 (e.g., the encrypted cache controller) compares the context identifier of the cache line with the context identifier of the reader context. If the two context identifiers do not match, the encrypted cache 364 returns all zeros for the cache line. If the context attempts to write to the cache line, the entire cache line is cleared in the encrypted cache 364 and the context identifier is changed to the writing context's context identifier.

In some examples, the above-described use of cache identifiers allows for fine grained context shifting (e.g., between functions in programs). If, for example, a program is compiled in encrypted code on another context and is executing it in the same thread, there will be data sharing (e.g., the stack is shared). If a thread A is in a secure context k and performs a function call to an encrypted library in a context j, it is reasonable to expect that other context to use the stack, but with a different key set. When the function call occurs, the stack pointer is moved, and the new context uses that frame. There is nothing guaranteeing that that frame wasn't used previously (and owned by context k), so this allows for the stack and heap to be shared at a line-level granularity.

In some examples, each context is associated with a static context mask that is XORED with the encryption mask 356 stored in the mask cache 352. Any data read from the encrypted cache 362 is therefore: data XOR mask XOR context mask. In this way, after a context switch, masks remaining in the mask cache 352 can not be used by a currently active context to read/write encrypted data associated with the previously active context.

In some examples, a different keyset are associated with different register windows in the processor. In some examples, the key set includes one or more keys for encrypting/decrypting data in the instruction cache and one or more other keys for encrypting/decrypting data in the data cache.

In general, when a context switch occurs for a process, a state of the process including all of the registers that the process is using (including the program counter), plus any other operating system specific data is saved (e.g., as a process control block or switchframe). In general, the saved state for the process need not be stored in an encrypted form since there is no hardware path between the registers associated with separate contexts, rendering the cleartext saved state unreadable by other contexts. Furthermore, a register window change forces a code key change, meaning that an attacker is unable to shift register windows and start executing their own code.

The approaches described above do not directly address prevention of replaying execution of software provided in encrypted form. For example, the loading procedure without further limitations could load the same program twice, and execute it twice, even though the client computer did not authorize such repeated execution. Although the client can use cryptographic techniques, for example, based on the public key of the target processor, to limit the locus of execution, such techniques do not prevent repeated execution.

An approach to limiting the number of executions of software, or as described below in an alternative limiting the time interval for execution, makes use of a hardware register in the processor that cannot be set to a desired value. An example of such a register would provide a destructive read of its value, such that after each read of the register, that value is necessarily incremented. Furthermore, in at least some embodiments, the value of the register is non-volatile such that the value cannot be reset using techniques such as removing the power from the processor. One approach to using such a register is for the client to communicate with the processor prior to forming the encrypted input 122 for the processor, with the processor providing an encryption of the current register value. The compiler includes the encrypted register value in a test instruction. Execution of the test instruction permits the program to execute only if the encrypted value provided in the instruction matches the current value in the register. The register value is incremented after being accessed by the test instruction. In some implementations, the program is permitted to be executed a certain number of times, and the test instructions performs a comparison of the value provided in the test instruction and the current register value, and only permits the software to execute if the register value has not been incremented more than the indicated number of times in the test instruction.

In an alternative approach, another register that is vital to the proper execution of the program is set according to a value of a register that changes value on each execution of a program. As in the above approach, the client contacts the processor prior to encoding the program, receives the next register value and encodes or encrypts the software according to the register value. Yet other alternative approaches may be used. For example, the nonce may be a register that is updated in a pseudorandom sequence on each execution, and the processor sends the nonce to the client (i.e., in encrypted form for decryption at the client). The nonce is then not included in the encrypted input but is rather generated in the zone 1 circuitry that sets the nonce register 358.

In yet another approach, the processor includes a time register, which increments over time and cannot be reset. The client requests the processors time (e.g., an encryption of the processors time register), and the client includes the returned value in a test instruction that compares the time with a valid interval length also included in the test instruction.

In some approaches, the register value is not maintained as a secret but is instead allowed to be exposed as it is provided to the client. However, in some examples, allowing such exposure provides a cleartext to ciphertext equivalent that can be used in a differential cryptanalysis attack on the system.

Figure 5:
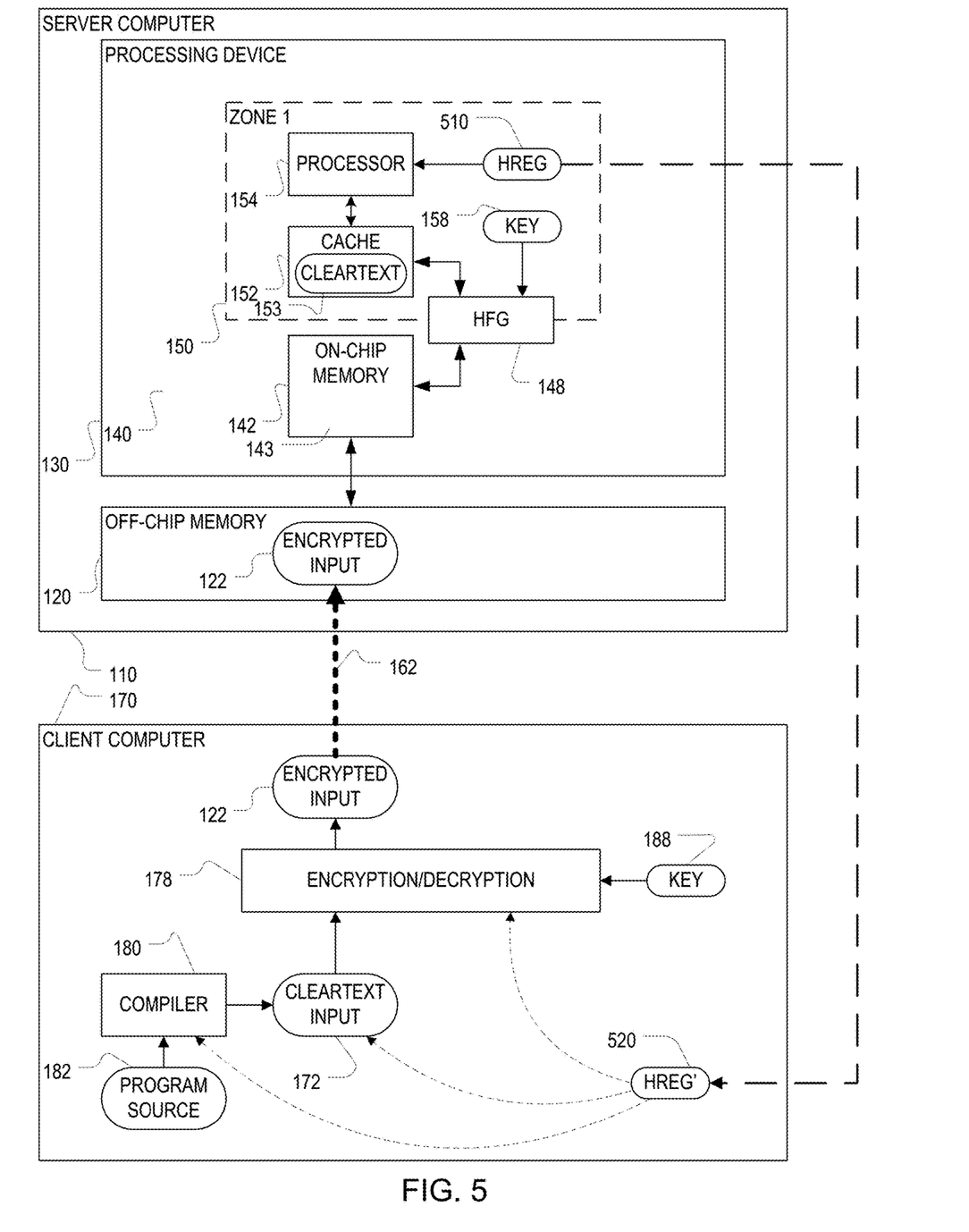
FIG. 5 is a block diagram illustrating a second approach that prevents repeated execution.

There are a number of variants of this approach to single or limited number of executions of the software. Referring to FIG. 5, what is common to the variants that are described and others is that there is a hardware register 510 that cannot be reset, and that is modified over time (e.g., at each access, at each execution of a program, at each tick of a clock) and that register generates a value 520 (e.g. a "token", "ticket") that can be provided (possibly encrypted) to the client and then returned embedded in the encrypted input for execution. For example, the value is used by the encryption/decryption module 178, added to the cleartext input 172, or used by the compiler 180 in generating the executable code (e.g., to include an explicit test instruction). Execution of the software is only permitted if the returned value matches according to a policy set in hardware in the processor and/or a policy set in the software itself, or in a combination of a policy in the processor and parameters for the policy set in the software. In some examples, an encrypted version of the value 520 is included in the keywrap. When the processor receives and processes the keywrap, the encrypted value in the keywrap is compared to the value in the hardware register 510 to determine whether the software can be executed.

In another embodiment, a consistency check mechanism is incorporated into the encrypted input so that the processor can detect tampering with the software. One reason that the software is potentially vulnerable to tampering is that, in at least some embodiments such as that illustrated in FIG. 3, the encryption is performed using an XOR of the encrypted part of the software with the mask that depends on the address for the part. An adversary is able to modify the software to be executed by performing an XOR operation on the encrypted version. For example, suppose a part of the program includes a literal value, for example, in an instruction such as "load register R2 with literal value 123" (where $123=01111011_2$) and an adversary were to know in some way that the literal 123 was encoded in a particular byte of the code, then the adversary could modify the literal to 210 ($=11010010_2$) merely by XORing the encrypted byte with 169 ($=10101001_2$). The processor would not be able to detect the tampering.

An approach to detecting potential tampering of the code makes use of introduction of consistency data into the encrypted input. As described below, there are two issues addressed in this approach. One issue has to do with address translation at runtime and another issue has to do with the method of detecting tampering.

Figure 6:
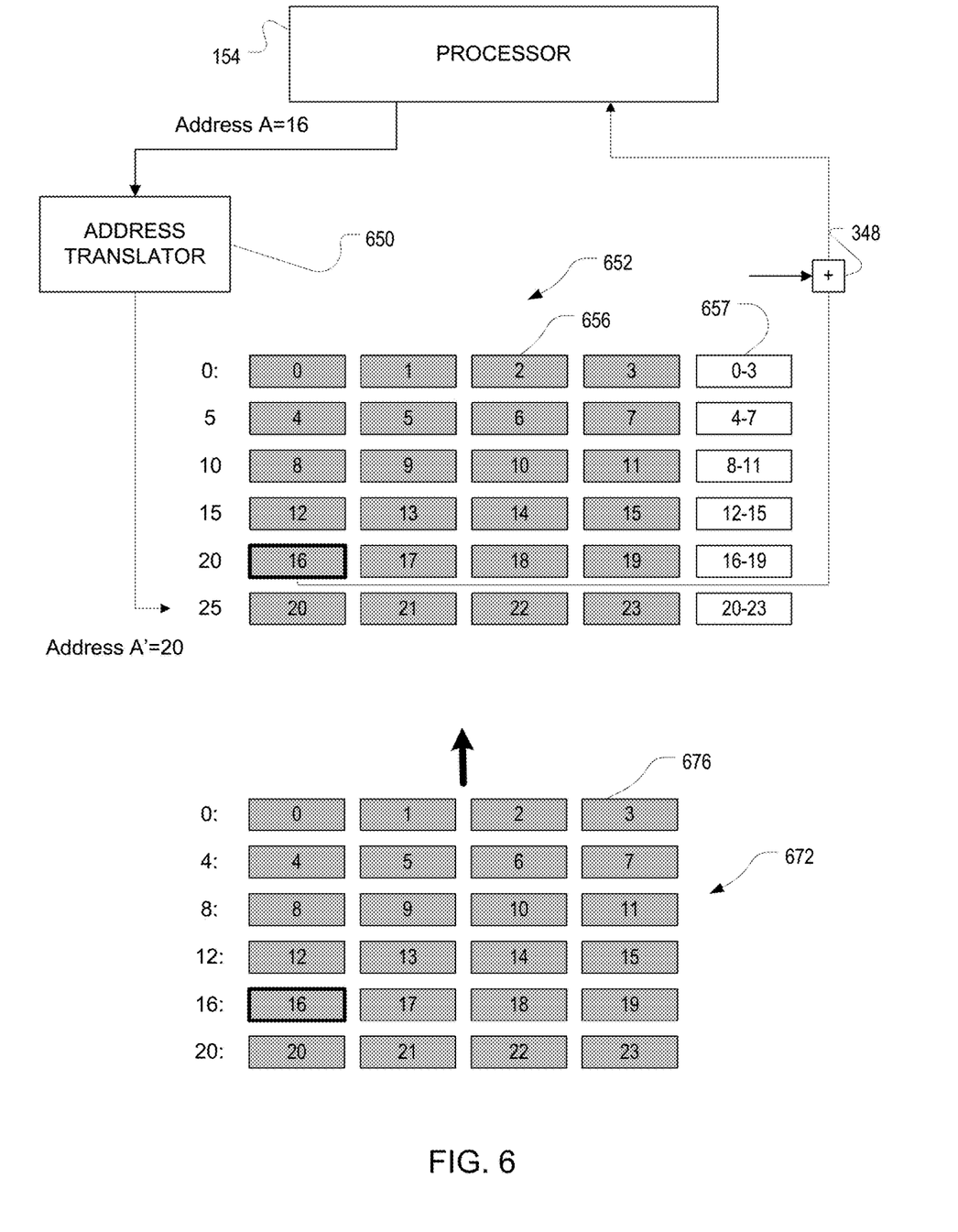
FIG. 6 is a diagram that illustrate introduction of redundant data into an encrypted input to prevent tampering.

Referring to FIG. 6, an example in which a sequence of parts 676 labeled 0 through 23 forms a portion 672 of unencrypted input, which for the sake of illustration is assumed to be loaded at virtual address zero. During the encryption process to generate the corresponding portion 652 of encrypted input rather than there being a one-to-one relationship between parts of the unencrypted input and parts of the encrypted input, a redundant part 657 is inserted. In this example, one redundant part 657 is inserted for every section of the encrypted cache. Therefore, when there is a cache miss and the section of the cache is read in from the on-chip or off-chip memory, one redundant part 657 and a number of encrypted input parts 656 are loaded into the section of the cache. In this illustration, each section of the cache holds five parts, of which four are encrypted input parts 656 and one is a redundant part 657, whose value depends on the values of the unencrypted input parts of the same segment. In this illustration, an original 24 input parts 676 when encrypted and after insertion of the redundant parts results in 32 parts of the encrypted input.

In order to compensate for the insertion of parts into the encrypted input, when a processor 154 requests an addressable part at an address A, for example in this simple illustration at address A=16, that address is passed through an address translator 650 (i.e., combinational circuitry) to produce an address A'=20. The encrypted value at address 20 (i.e., the encrypted part 16 (676)) is passed through the combination circuitry 348, where it is combined with the mask for address 20 from the mask memory (not shown in FIG. 6).

More generally, the redundant portion of each section is made up of SC addressable parts (e.g., its size in bytes), and the section of the cache (e.g., cache line) is made up of SL addressable parts (e.g., the cache line size in bytes), which is assumed to be a power of two multiple of SC, then the translation of an address A to a corresponding address A' can be expressed as:

N=SL/SC/*the number of "chunks" in each cache line*/

L=A/SL/*number of skipped chunks*/

A'=A+L*SC/*add in the addresses for the skipped chunks*/

In the example illustrated in FIG. 6, SC=1, SL=4, A=16, L=4, A'=16+4=20.

In some examples, it is possible that the translated address, A' points to a redundant part 657. When such a case is detected, the translated address, A' is incremented by the size of the addressable part, SC since the correct address is at the next addressable part.

Note that if the number of chunks in each cache line, N is a power of 2, then the division A/SL and the multiply L*SC can be implemented in low delay combinational circuitry since multiplication and division operations can be implemented as bit shifts in binary.

In some examples, the unencrypted form of the redundant part 657 of a cache section is preferably a non-linear function of the unencrypted forms of the other parts 656 of the same cache section. One choice for the non-linear function is a hash function. In some examples, the non-linear function can begin computing the redundant part of a cache section prior to the entire cache section arriving (e.g., by processing the parts of the cache section as they arrive).

In some examples, to ensure cache integrity, the redundant parts are checked each time a cache miss occurs in the encrypted cache 362, causing a cache section to be filled from a lower level in the memory hierarchy (e.g., from the off-chip memory 120) and the redundant parts are updated whenever a modified section 364 of the encrypted cache 362 is evicted from the encrypted cache 362. The secure processor includes cache integrity module that is operable in an integrity verification mode to verify the integrity of the encrypted cache 362 and in an integrity preservation mode to update redundancy information for preservation of the integrity of the encrypted cache 362.

Figure 7:
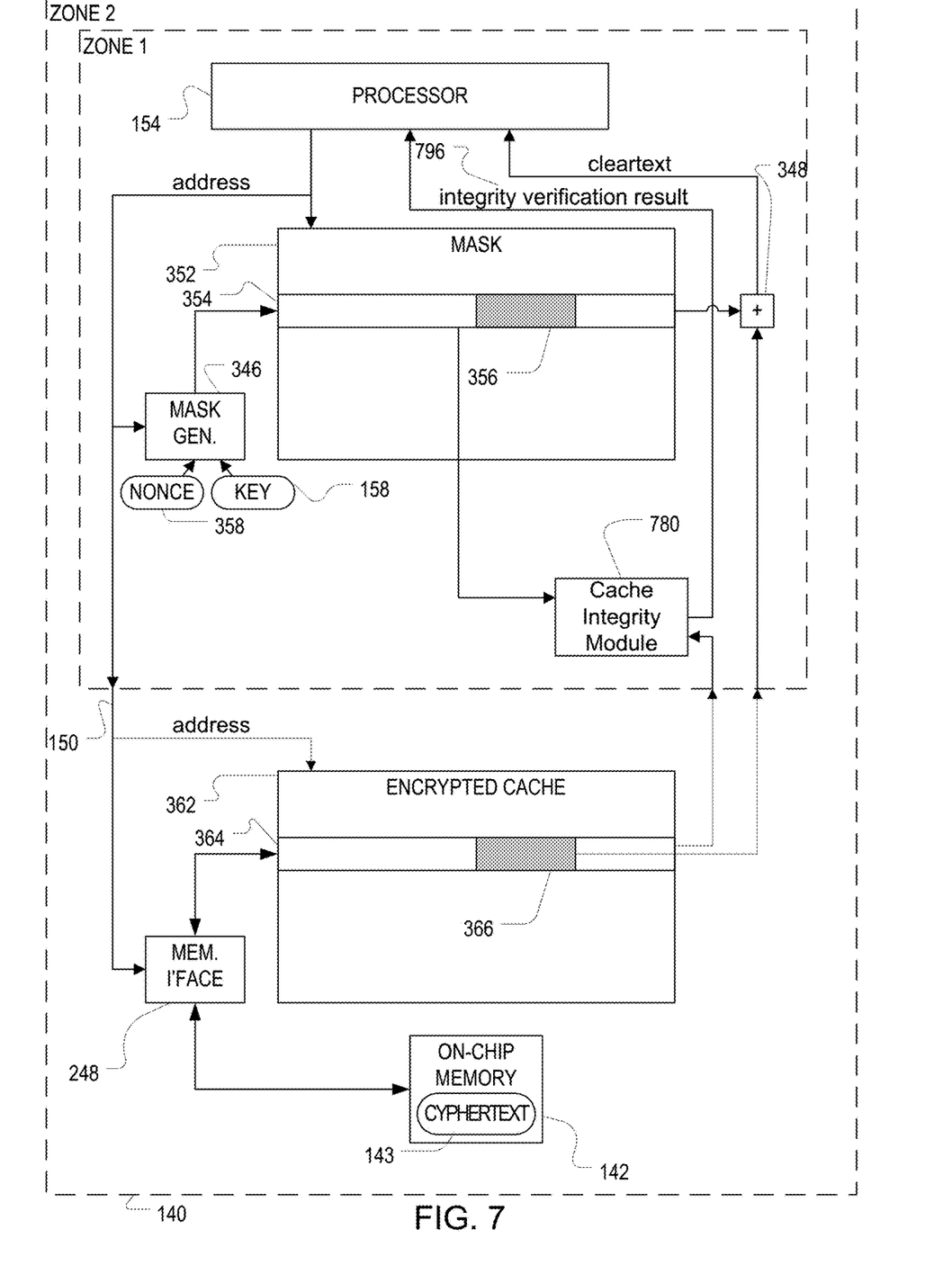
FIG. 7 is a block diagram illustrating a client and server computer system including a cache integrity module operating in a cache integrity verification mode.

Referring to FIG. 7, when a request for data stored at a given memory address results in a cache miss in the encrypted cache 362, the memory interface 248 reads a section of memory (e.g., a page from an external disk) that includes the data stored at the given memory address and copies the data stored in the section of memory into an encrypted cache section 364 in the encrypted cache 362.

The encrypted cache section 364 (including its redundant part 657) is passed from the encrypted cache 362 in zone 2 to a cache integrity module 780 in zone 1. The cache integrity module 780 also receives the masks 354 associated with the encrypted cache section 364 from the mask memory 352 as input. When operating in its integrity verification mode, the cache integrity module 780 processes the encrypted cache section 364 and the masks 354 associated with the encrypted cache section 364 to determine an integrity verification result 796 which it provides to the processor 154. In some examples, the integrity verification result 796 is simply an exception that, when raised, halts or otherwise modifies the operation of the processor 154 due to loss of cache integrity. In general, once the cache integrity module 780 generates an integrity verification result 796 which indicates that the data in the encrypted cache section 364 has not been tampered with, then the processor 154 is allowed to read the data in the encrypted cache section 364 for as long as it resides in the encrypted cache 362 without having to repeat the integrity verification process.

As is illustrated in FIG. 7, in some examples, to reduce any time delay caused by the integrity verification process, the encrypted cache part 366 at the requested address in the encrypted data cache 362 is provided to the combination circuitry 348 for decryption using its associated mask from the mask memory 352 in parallel with the integrity verification process.

Figure 8:
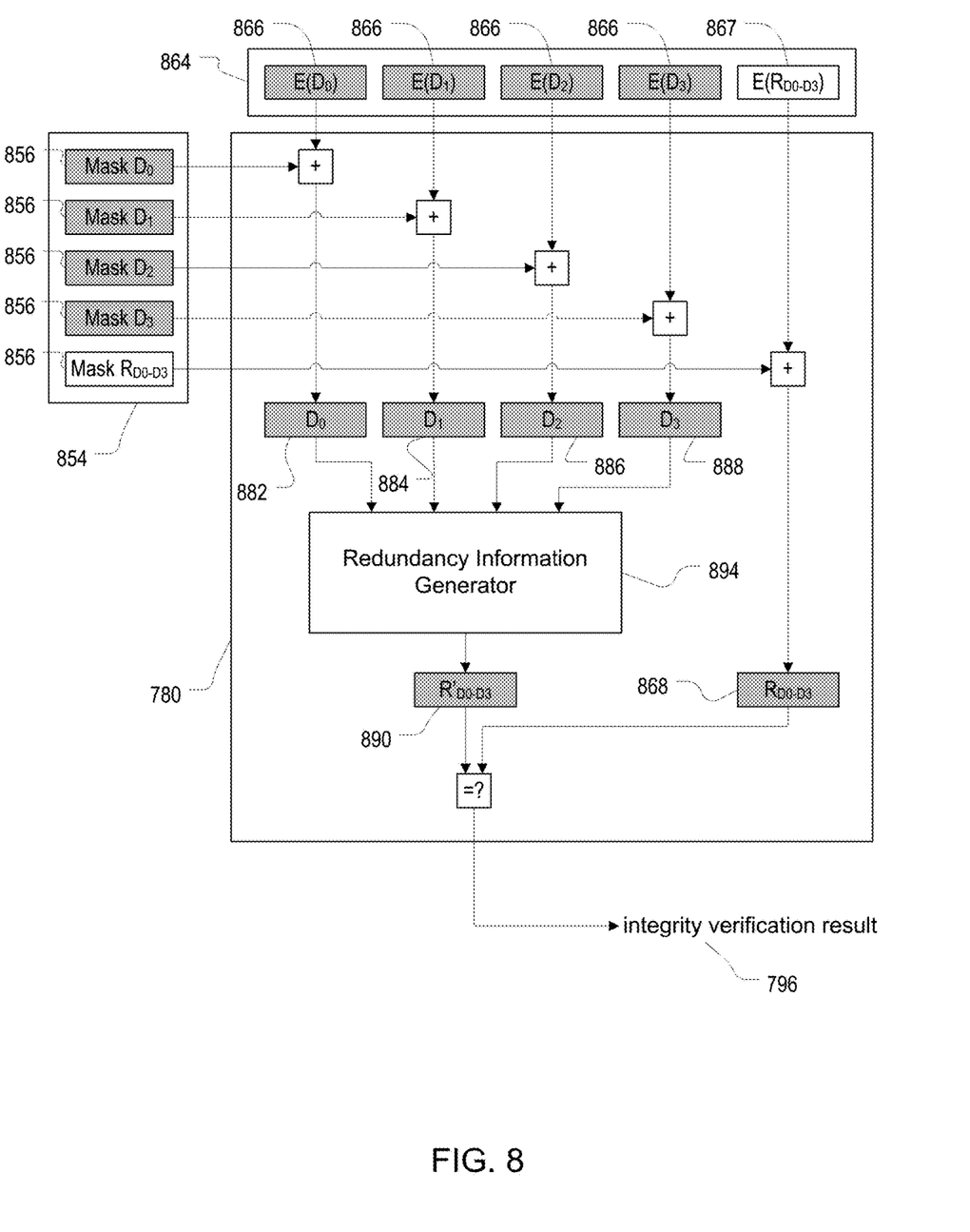
FIG. 8 is the cache integrity module of FIG. 7 configured in a cache integrity verification mode.

Referring to FIG. 8, in one example, with the cache integrity module 780 operating its integrity verification mode, the cache section 864 provided to the cache integrity module 780 includes four encrypted data parts 866 (i.e., $E(D_0)$, $E(D_1)$, $E(D_2)$, and $E(D_3)$) and one encrypted redundant part 867 (i.e., $E(R_{D0-D3})$). The section 854 of the mask memory 852 provided to the cache integrity module 780 includes five masks 856, each corresponding to a different part of the encrypted cache section 864.

To verify the integrity of the encrypted cache section 864, the cache integrity module 780 performs an XOR of each encrypted part 866, 867 of the cache section 364 with the mask 856 that corresponds to the part 866, 867 to generate an unencrypted (i.e., cleartext) version of each of the data parts (i.e., $D_0$ 882, $D_1$ 884, $D_2$ 886, $D_3$ 888) and an unencrypted version of the redundant part 868 (i.e., $R_{D0-D3}$). The unencrypted versions of the data parts are provided to a redundancy information generator 894 which generates redundancy information 890 (i.e., $R_{D0-D3}$) from the data parts.

The redundancy information, $R'_{D0-D3}$ 890 generated by the redundancy information generator 894 is then compared to the unencrypted version of the redundant part, $R_{D0-D3}$ 868 to determine whether the two redundant parts match. If the encrypted data parts 866 in the encrypted cache section 864 have not been tampered with, $R'_{D0-D3}$ and $R_{D0-D3}$ will match, resulting in an integrity verification result 796 indicating that the integrity of the encrypted data cache 362 is intact. Otherwise, if the encrypted data parts 866 in the encrypted cache section 864 have been tampered with, $R'_{D0-D3}$ and $R_{D0-D3}$ will not match, resulting in an integrity verification result 796 indicating that the integrity of the encrypted data cache 362 is not intact. As is described above, the integrity verification result 796 is passed out of the cache integrity module 780 for use by the processor 154.

As is mentioned above, in computing systems that utilize caches, before an encrypted cache section 364 can be filled with new data (i.e., data from memory at a lower level in the memory hierarchy), the data currently occupying the encrypted cache section 364 must be evicted and, in some cases, written back to memory at a lower level in the memory hierarchy. For example, when one or more encrypted data parts 366 of an about-to-be-evicted encrypted cache section 364 in the encrypted cache 362 have been written (i.e., modified) by the processor 154, the encrypted cache section 364 may need to be written back to the memory as part of the eviction process. Since the redundant part of the encrypted cache section 364 depends on the unencrypted versions of the data parts, the redundant part of the encrypted cache section 364 needs to be updated to reflect the modifications to the encrypted data parts 366 prior to eviction of the encrypted cache section 364 from the encrypted cache 362.

Figure 9:
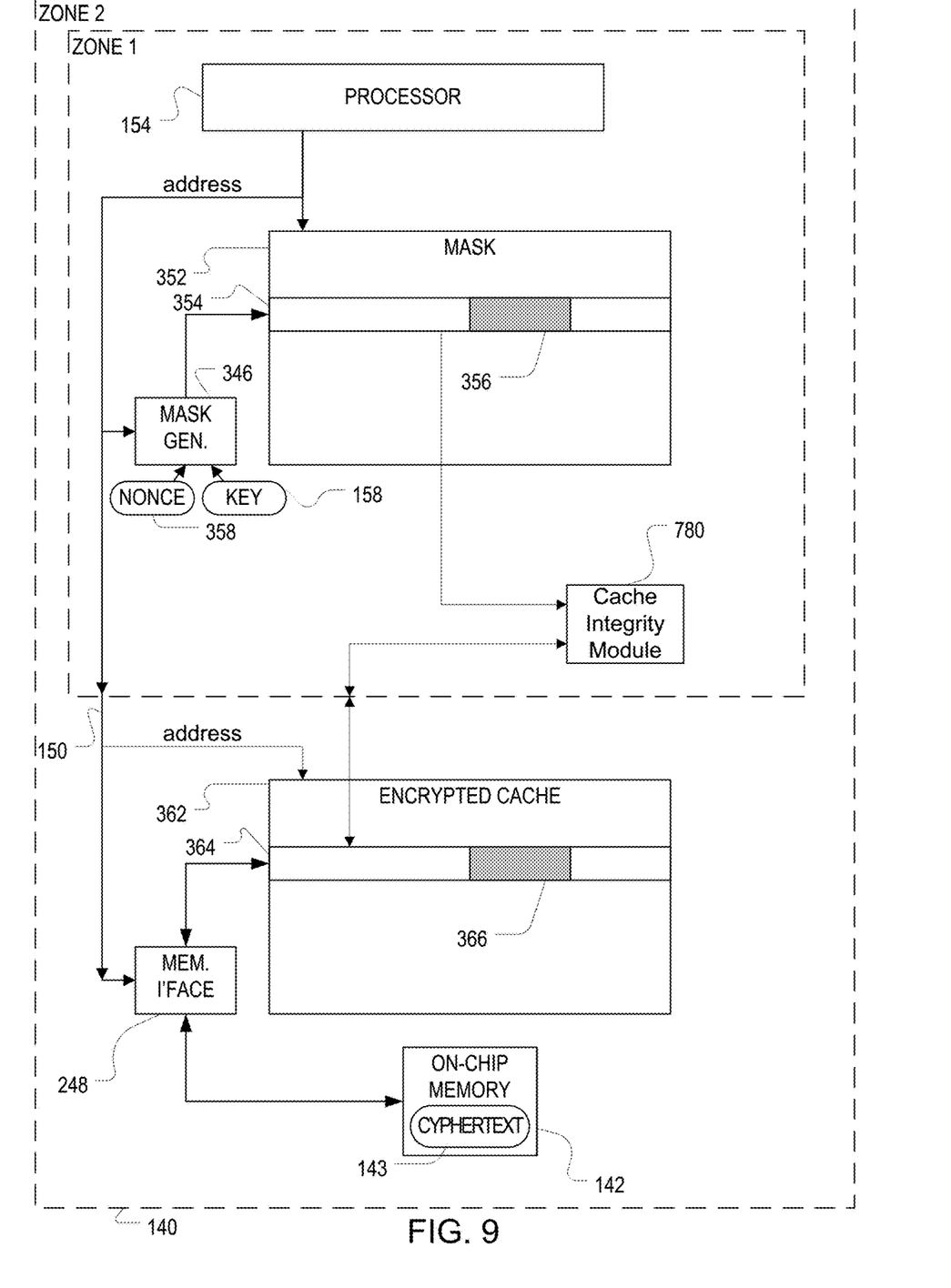
FIG. 9 is a block diagram illustrating a client and server computer system including a cache integrity module operating in a cache integrity preservation mode.

For example, referring to FIG. 9, before an encrypted cache section 364 that has been modified by the processor 154 is evicted from the encrypted data cache 362, the encrypted cache section 364 (including its encrypted redundant part) is passed from the encrypted cache 362 in zone 2 to the cache integrity module 780 in zone 1. The cache integrity module 780 also receives the masks 354 associated with the encrypted cache section 364 from the mask memory 352 as input.

When operating in its integrity preservation mode, the cache integrity module 780 processes the encrypted cache section 364 and the masks 354 associated with the encrypted cache section 364 to update the encrypted redundancy part of the encrypted cache section 364 to reflect the modifications made to the encrypted cache section 364 prior to eviction. After updating the encrypted redundancy part, the cache integrity module 780 writes the updated encrypted cache section back to the encrypted cache 362 which subsequently evicts the updated encrypted cache section.

Figure 10:
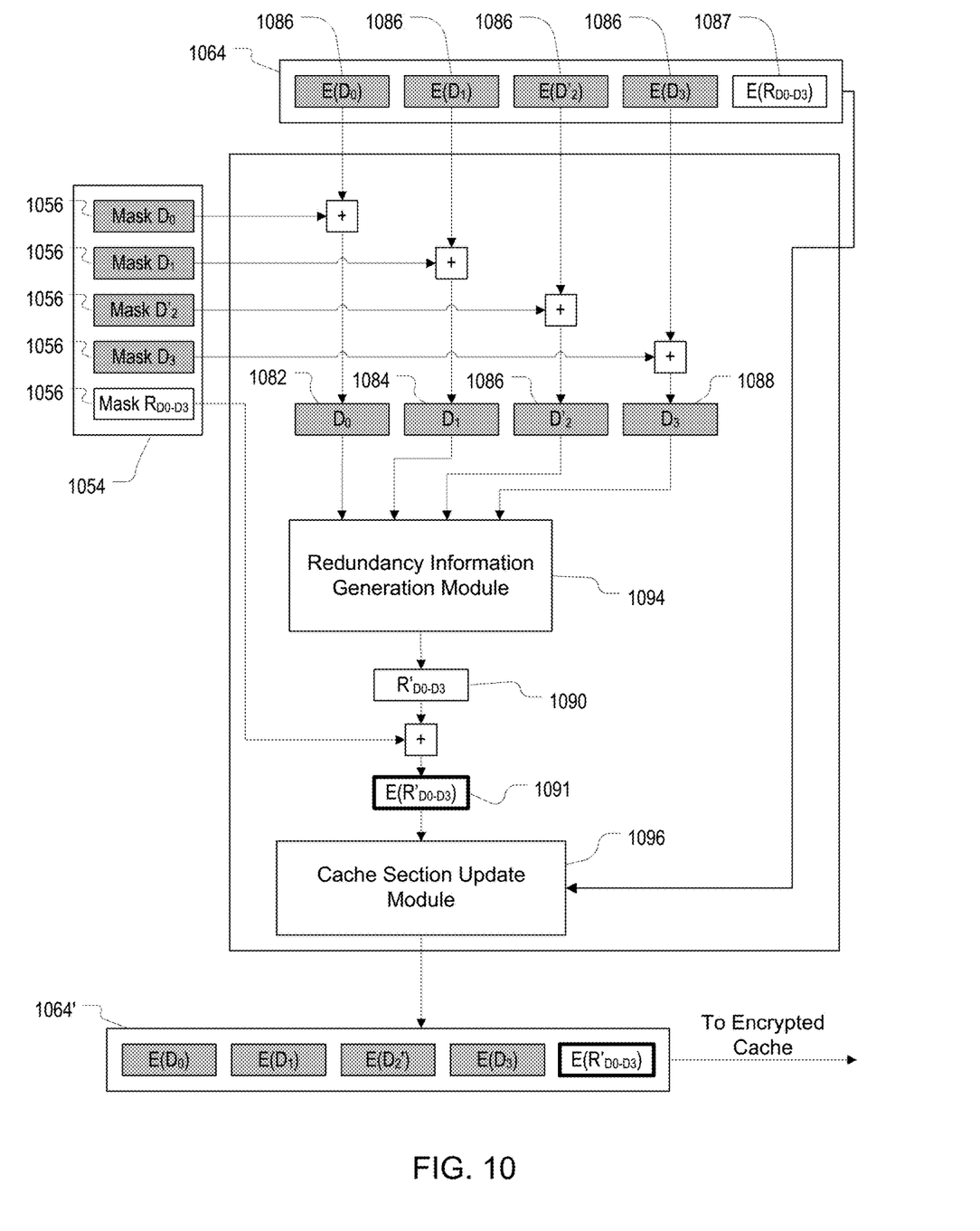
FIG. 10 is the cache integrity module of FIG. 9 configured in a cache integrity preservation mode.

Referring to FIG. 10, in one example, with the cache integrity module 780 operating an integrity preservation mode, the cache section 1064 provided to the cache integrity module 780 includes four encrypted data parts 1066 (i.e., $E(D_0)$, $E(D_1)$, $E(D_2')$, and $E(D_3)$) and one encrypted redundant part 1087 (i.e., $E(R_{D0-D3})$). Note that one of the encrypted data parts, $E(D_2')$ was modified by the processor 154 at a time after it was read into the encrypted cache 362. The section 1054 of the mask memory 1052 provided to the cache integrity module 780 includes five masks 1056, each corresponding to a different part of the cache section 1064.

To preserve the integrity of the encrypted cache section 1064, the cache integrity module 780 generates an updated encrypted redundant part 1091 and replaces the original encrypted redundant part 1087 with the updated encrypted redundant part 1091. To do so, the cache integrity module 780 performs an XOR of each encrypted data part 1066 of the encrypted cache section 1064 with the mask 1056 that corresponds to the encrypted data part 1066 of the encrypted cache section 1064 to generate an unencrypted (i.e., cleartext) version of each of the data parts (i.e., $D_0$ 1082, $D_1$ 1084, $D_2'$ 1086, $D_3$ 1088). The unencrypted versions of the data parts are provided to the redundancy information generator 1094 which generates updated redundant part, $R'_{D0-D3}$ 1090 from the data parts.

An XOR of the updated redundant part, $R'_{D0-D3}$ 1090 is performed with the mask 1056 that corresponds to the redundant part of the encrypted cache section 1064, resulting in the updated encrypted redundant part 1091. The encrypted cache section 1064 and the updated encrypted redundant part 1091 are provided to a cache section update module 1096 which replaces the original encrypted redundant part 1087 with the updated encrypted redundant part 1091 in the encrypted cache section 1064, resulting in an updated encrypted cache section 1064'. As is described above, the updated encrypted cache section 1064' is written back to the encrypted cache 362 and is subsequently evicted.

It is to be understood that the foregoing description is intended to illustrate and not to limit the scope of the invention, which is defined by the scope of the appended claims. Other embodiments are within the scope of the following claims.

What is claimed is:

1. A method for processing, in an integrated circuit, addressable encrypted data representing addressable cleartext data, the integrated circuit including a processor circuit and a first storage circuit in a first circuit region of the integrated circuit having a first level of security, the processor circuit having a first memory interface for providing an address from the processor circuit and communicating corresponding addressable data to or from the processor circuit, the method comprising processing the addressable cleartext data in the processor circuitry without storing said cleartext data outside the processor circuit, the processing comprising:

maintaining addressable mask data in the first storage circuitry, the mask data having a plurality of segments, each segment being associated with a corresponding address, wherein the mask data for a segment depends at least in part on the corresponding address of said segment;

providing an address via the first memory interface from the processor circuit in the first circuit region to the first storage circuitry and to a second memory interface associated with a second storage circuitry in a second circuit region of the integrated circuit having a second level of security less than the first level of security;

accessing a mask segment corresponding to said provided address from the first storage circuitry;

accessing encrypted data associated with the provided address from the second storage circuitry according to the provided address, the accessing including one of a) reading the encrypted data from the provided address and b) storing the encrypted data at the provided address; and combining the accessed mask segment with data passing between the first memory interface of the processor circuit and the second storage circuitry without storing corresponding cleartext data outside the processor circuitry, wherein combining the accessed mask segment with the data includes one of a) combining the mask segment with the accessed encrypted data read from the second storage circuitry and b) combining the mask segment with the cleartext data provided by the processor circuitry for storing the encrypted data to the second storage circuitry.

2. The method of claim 1 further comprising generating the mask segment corresponding to said address according to the provided address and storing the mask segment in the first storage circuitry.

3. The method of claim 2 further comprising accessing the encrypted data associated with the provided address from a third storage according to the provided address, wherein the generation of the mask segment occurs during the accessing of the encrypted data associated with the provided address from the third storage.

4. The method of claim 2 wherein generating the mask segment according to the provided address includes combining the provided address with a secret key value, the secret key value being associated with the addressable encrypted data.

5. The method of claim 4 wherein generating the mask segment according to the provided address includes further combining the combination of the provided address and the secret key value with a nonce value and a counter value representing an offset from the provided address.

6. The method of claim 1 wherein combining the accessed mask segment with data passing between the first memory interface of the processor circuit and the second storage circuitry includes performing an exclusive-or operation on the accessed mask segment and the data.

7. The method of claim 1 further comprising combining the accessed mask segment and the data with processor context-specific mask data.

8. The method of claim 1 wherein providing the address via the first memory interface from the processor circuit includes executing a load or a store instruction in the processor circuit to cause the address to be provided.

9. The method of claim 8 further comprising storing the cleartext data in register circuitry internal to the processor circuit.

10. The method of claim 1 further comprising initiating processing of the addressable encrypted data including,
executing a loading instruction for loading a secure processor context into the integrated circuit, including loading a secret key, the nonce, and context-specific mask data into the integrated circuit; and
executing a secure jump instruction for activating the secure processor context.

11. The method of claim 10 wherein executing the loading instruction includes authenticating a source of the secure context using certificate and signing techniques.

12. The method of claim 10 wherein executing the loading instruction includes decrypting an encrypted version of the secret key and an encrypted version of the nonce.

13. The method of claim 1 further comprising accessing redundancy data associated with the provided address from the second storage circuitry, the redundancy data being formed from the cleartext data associated with the provided address.

14. The method of claim 13 further comprising verifying an integrity of the encrypted data according to the redundancy data.

15. The method of claim 14 wherein verifying the integrity of the encrypted data includes recomputing the redundancy data according to the corresponding cleartext and comparing the recomputed redundancy data to the accessed redundancy data.

16. The method of claim 13 further comprising updating the redundancy data prior to accessing the encrypted data.

17. The method of claim 16 wherein updating the redundancy data prior to accessing the encrypted data includes computing updated redundancy data according to updated cleartext data provided from the processor circuit.

18. An integrated circuit for processing addressable encrypted data representing addressable cleartext data, the integrated circuit including:
a first circuit region having a first level of security;
a second circuit region having a second level of security less than the first level of security;
a first storage circuit in the first circuit region for maintaining addressable mask data, the mask data having a plurality of segments, each segment being associated with a corresponding address, wherein the mask data for a segment depends at least in part on the corresponding address of said segment;
a processor circuit in the first circuit region, the processor circuit having a first memory interface for
providing an address from the processor circuit to the first storage circuit for accessing a mask segment corresponding to the address from the first storage circuit, and to a second memory interface associated with a second storage circuit in the second circuit region for accessing encrypted data associated with the address in the second storage circuit, the accessing including one of a) reading the encrypted data from the provided address and b) storing the encrypted data at the provided address, and
communicating corresponding addressable data to or from the processor circuit; and
combination circuitry for combining the mask segment accessed from the first storage circuitry with data passing between the first memory interface of the processor circuit and the second storage circuitry without storing corresponding cleartext data outside of the processor circuitry, wherein combining the accessed mask segment with the data includes one of a) combining the mask segment with the accessed encrypted data read from the second storage circuitry and b) combining the mask segment with the cleartext data provided by the processor circuitry for storing the encrypted data to the second storage circuitry.

19. The method of claim 1 wherein the mask data for a segment is formed as a functional combination of the corresponding address of said segment and at least one other value.

* * * * *